United States Patent [19]
Tickett

[11] 3,650,547
[45] Mar. 21, 1972

[54] PIPE FITTING
[72] Inventor: Edward F. Tickett, El Paso, Tex.
[73] Assignee: Alex B. Reynolds, St. Louis, Mo.
[22] Filed: Mar. 5, 1971
[21] Appl. No.: 121,439

Related U.S. Application Data

[63] Continuation-in-part of Ser. No. 864,739, Oct. 8, 1969, abandoned, Continuation-in-part of Ser. No. 54,398, July 13, 1970.

[52] U.S. Cl. ............................. 285/3, 29/157, 30/101, 137/318, 285/48, 285/373
[51] Int. Cl. ......................... F16l 21/02, F16l 21/06
[58] Field of Search ............... 137/318, 317, 15; 251/146; 30/101; 82/4.3, 70.2; 29/157; 192/101; 285/3, 4, 15, 16, 373, 197, 48, 53, 47

[56] References Cited

UNITED STATES PATENTS

| 587,092 | 7/1897 | French | 137/317 X |
|---|---|---|---|
| 1,811,046 | 6/1931 | Goldhagen | 30/101 |
| 1,898,935 | 2/1933 | Brandriff | 251/146 X |
| 2,959,692 | 11/1960 | Marx | 285/48 X |
| 3,108,499 | 10/1963 | Duncan | 137/318 X |
| 3,249,369 | 5/1966 | Jahrig | 285/53 |
| 3,385,314 | 5/1968 | Thompson | 137/318 |

FOREIGN PATENTS OR APPLICATIONS

| 733,220 | 7/1955 | Great Britain | 285/197 |

Primary Examiner—Thomas F. Callaghan
Attorney—Cohn & Powell

[57] ABSTRACT

This pipe fitting is formed from a pair of coupling halves which are fastened together about a continuous pipe. One of the coupling halves includes a built-in cutter assembly capable of severing the pipe into sections which are subsequently coupled together by the coupling halves. The other coupling half includes a built-in spacer assembly providing an insulated spacer block which is inserted between the ends of the separated pipe sections. The pipe sections are electrically insulated from each other by the spacer block and by insulated pipe liners carried by the coupling halves to facilitate cathodic protection. Continuous seals between the coupling halves preclude the escape of fluid from the separated pipe sections.

7 Claims, 4 Drawing Figures

Inventor
EDWARD F. TICKETT

By Cohn and Powell
Attorneys

Patented March 21, 1972

Inventor
EDWARD F. TICKETT

By Cohn and Powell
Attorneys 3,650,547

PIPE FITTING

CROSS REFERENCE TO RELATED APPLICATIONS

This is a continuation-in-part of copending applications, Ser. No. 864,739, filed Oct. 8, 1969 and now abandoned, and Ser. No. 54,398, filed July 13, 1970.

BACKGROUND OF THE INVENTION

This invention relates in general to a pipe fitting for severing a pipeline into sections and thereafter coupling the severed sections together, and in particular to a fitting which insulates the separated sections from each other to facilitate cathodic protection without interrupting flow through the pipeline.

Metal pipelines suffer severely from corrosion, particularly when they are buried or partly submerged. Cathodic protection has been used for many years as a means of combating corrosion. This form of protection consists essentially of electrically connecting an anode element to the pipeline, which corresponds to a cathode element, in such a way that the anode oxidizes, rather than the pipeline. It is advantageous in such a system to provide an anode element to service a predetermined section of the pipeline and, in consequence, particularly when existing pipelines are to be protected, it becomes necessary to cut and separate continuous pipelines and electrically isolate them from each other.

The prior art reveals devices which are capable of severing a pipeline for the purpose of inserting a valve, for example, without cutting off flow through the pipeline, but known devices utilize stationary housing which enclose independently movable cutting means operated by remote control. Such devices are cumbersome and expensive.

SUMMARY OF THE INVENTION

This pipe fitting provides a means of severing, separating and electrically isolating sections of a continuous pipeline from each other in order to facilitate cathodic protection of predetermined lengths of pipeline. The pipe fitting permits severing, isolating and coupling of the pipe sections to be accomplished while maintaining uninterrupted flow through the pipeline. The fitting is insulated from the pipe sections by insulated liners and an insulated spacer insulates the ends of the pipe sections from each other. The spacer is automatically positioned when the pipe sections are separated. The cutter means by which the pipe sections are severed, is operated directly, rather than by remote control. Continuous seals provide both temporary sealing during the cutting operation and permanent sealing following final coupling of the pipe sections together.

The fitting includes a coupling providing coupling halves attachable together about the pipe. Cutter means carried by the coupling is adapted to engage and sever the pipe into sections when the coupling is rotated about the pipe. The fitting is adapted to couple the pipe sections together following separation. Spacer means carried by the coupling and including an insulated portion mounted independently of the cutter means, is adapted to be disposed between the pipe sections to isolate said pipe sections from electrical contact with each other.

The cutter means includes a cutter block and one of the coupling halves includes a cutter compartment movably mounting the cutter block. The spacer means includes a spacer block and the other coupling half includes a spacer compartment movably mounting the spacer block.

Each coupling half includes a liner insulating the associated coupling halves from the pipe and each liner includes an aperture communicating between an associated cutter or spacer compartment. Each aperture receives an associated cutter or spacer block and limits inward movement thereof. The cutter block is formed from an electrically nonconductive material and is substantially, diametrically opposite to the spacer block to provide another spacer.

The cutter means includes cutter advancing means urging the cutter block radially inward, and the spacer means includes spring means urging said spacer block radially inward toward said cutter block.

DESCRIPTION OF THE PREFERRED EMBODIMENT

Figure 1:
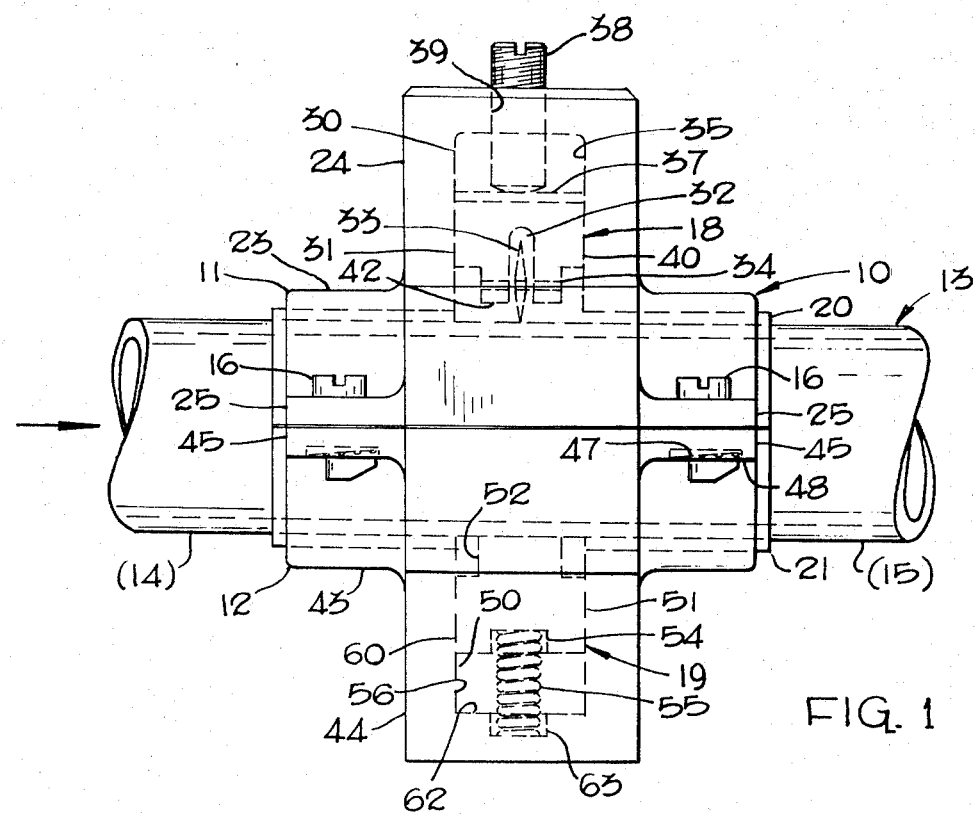
FIG. 1 is an elevational view of the pipe fitting mounted to the pipeline before the pipe sections are severed.
Figure 2:
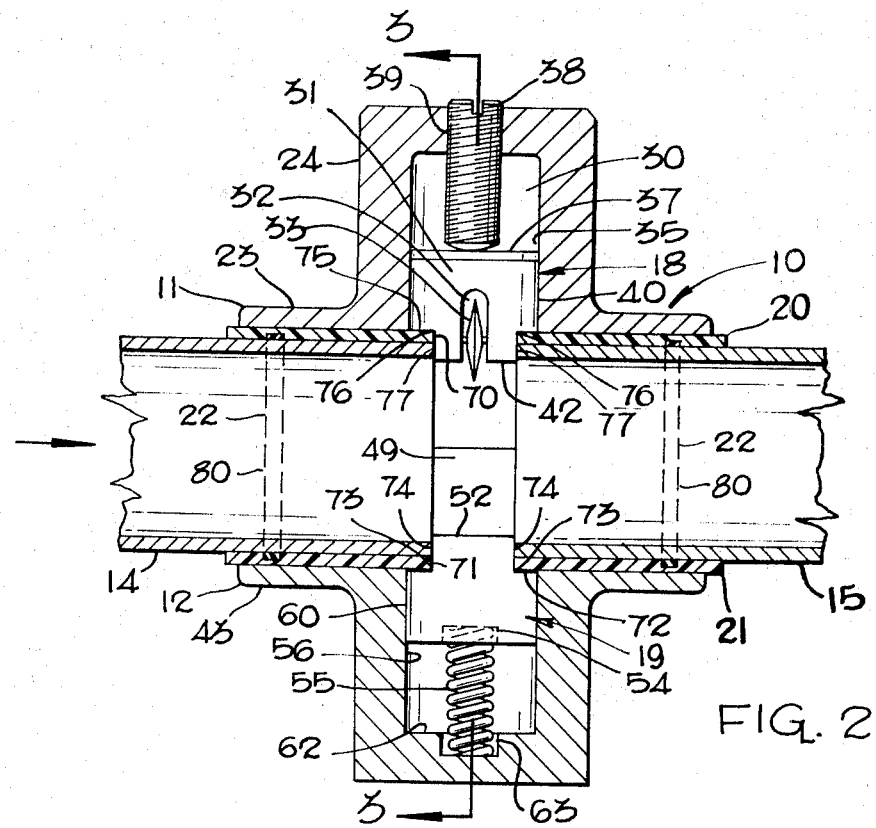
FIG. 2 is a sectional elevational view through the pipe fitting following the severing and separating of the pipeline into sections.

Referring now by characters of reference to the drawings and first to FIGS. 1 and 2, it will be understood that the pipe fitting for severing and coupling a fluid pipeline is provided by a coupling 10 formed from upper and lower coupling halves 11 and 12 constituting coupling portions. The coupling 10 is rotatively mounted to a pipe 13 conveying natural gas or other fluid under pressure, and is used for the purpose of separating the pipe 13 into upstream and downstream sections 14 and 15 and thereafter coupling the severed sections together. FIG. 1 indicates the disposition of coupling parts prior to the severing of the pipe 13 and FIG. 2 indicates the disposition of coupling parts following severing of the pipe 13 into sections 14 and 15.

The coupling halves 11 and 12 are connected together for rotation about the pipe 13 in a first mounted condition during which L-shaped fasteners 16 connecting the halves together through keyhole-shaped holes 17 are only partially tightened so that rotation can take place. The upper coupling half 11 is adapted to carry a cutter assembly, generally indicated by numeral 18. The lower coupling half 12 is adapted to carry a spacer assembly, generally indicated by numeral 19. When the pipeline 13 has been severed, the separated pipe sections 14 and 15 are drawn apart. The sections are held apart by the spacer assembly 19 to ensure that the ends of said separated sections are not in electrically conductive engagement with each other. The fasteners 16 are then fully tightened to clamp the coupling 10 firmly in place in a second mounted condition.

The pipe sections 14 and 15 are insulated from the coupling 10 by a pair of liners 20 and 21, carried by associated coupling halves 11 and 12 respectively. A pair of continuous, resilient seals, indicated by numerals 22, see FIG. 4, preclude fluid escape in both the first and second mounted conditions.

Figure 3:
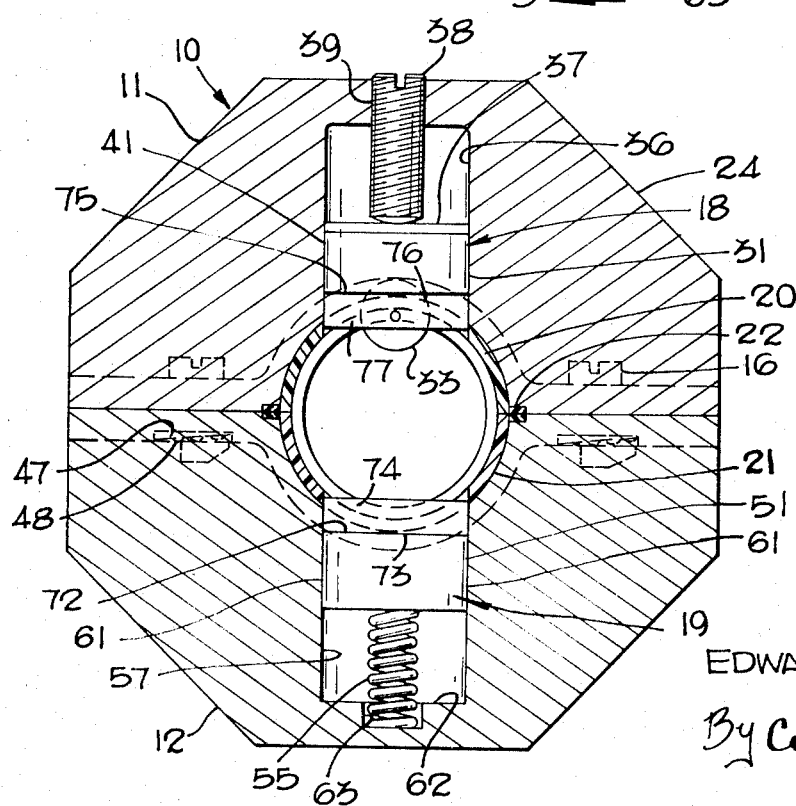
FIG. 3 is a cross sectional view taken on line 3—3 of FIG. 2.

The upper coupling half 11 includes a substantially semicircular body 23 having an enlarged, integrally formed semi-octagonal midportion 24. The body 23 is flanked by opposed flanges 25 which include the keyhole-shaped holes 17. The midportion 24 is hollow and provides a cutter compartment 30 housing the cutter assembly 18. The cutter assembly 18 includes a cutter block 31 having a recess 32 serving to receive a cutter wheel 33 mounted to the cutter block 31 by means of a pin 34. The cutter compartment 30 is partially defined by opposed flat faces 35 and opposed flat faces 36 which are slidingly engaged respectively by the sides 40 and ends 41 of the cutter block 31. See FIGS. 2 and 3. The cutter block 31 is substantially T-shaped to provide a stem 42 and is compatibly shaped to suit the generally rectangular configuration of the cutter compartment 30 to preclude rotation of the cutter block 31 therein. The cutter block 31, which is preferably of an electrically nonconductive material, includes a metal backing plate 37 and during the cutting process, the cutting block 31 is advanced by a pressure screw 38 received within a threaded hole 39 and bearing directly on said backing plate 37.

The lower coupling half 12 is similar to the upper half 11 in that it includes a substantially semicircular body 43 having an enlarged, integrally formed semi-octagonal midportion 44. The body 43 is flanked by opposed flanges 45 which include keyhole-shaped holes 17 registerable with matching holes 17 in the upper coupling half 11. The holes 17 in the lower flange are countersunk to provide an inclined annular plane 47 having a plurality equally spaced protuberances 48 engageable by the first of the L-shaped fasteners 16 to hold the fastener in place as it is tightened by rotation. The midportion 44 is hollow to provide a spacer compartment 50 housing a spacer assembly 19 therewithin. The spacer assembly 19 includes a T-shaped spacer block 51 having stem 52 and said spacer block 51 includes a recess 54 which accommodates one end of a compression spring 55. The generally rectangular spacer compartment 50 is defined by opposed flat faces 56 and opposed flat faces 57 which are slidingly engaged respectively by sides 60 and ends 61 of the spacer block 51. The spacer compartment 60 is defined in part by an end wall 62 which is provided with a recess 63 accommodating the other end of the compression spring 55.

Figure 4:
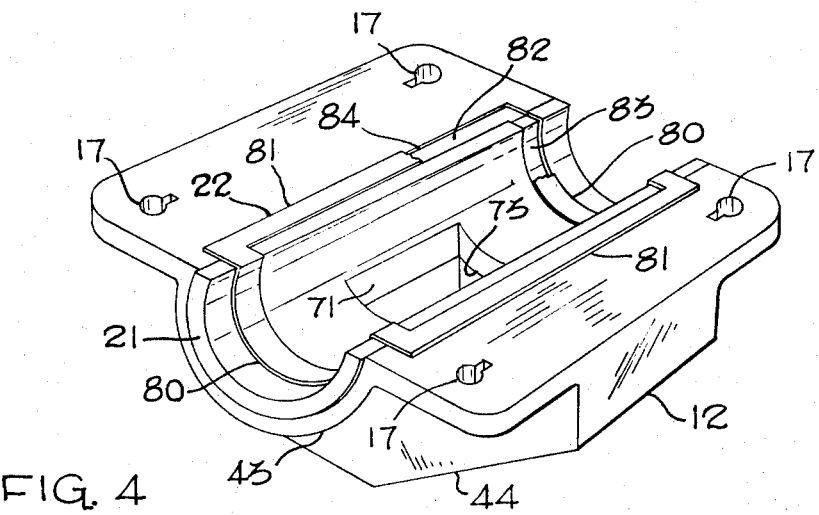
FIG. 4 is a perspective view of the lower coupling half illustrating the liner and seal.

The insulating liners 20 and 21, carried by the coupling halves are formed of electrically nonconductive material and are substantially semicircular in cross section and each includes a rectangular aperture 70 or 71. Aperture 71, shown in FIGS. 2 and 4, is adapted to receive the stem 52 of the spacer block 51. Opposed spacer block shoulders 72 provided adjacent the stem 52 are engaged by margins 73 of the aperture 71 to limit inward movement of the spacer stem 52 and hold the spacer block 51 in position. The stem 52 is of sufficient length to project inwardly of the liner 21 and includes spaced abutment faces 74 which are engaged by the ends of associated pipe sections 14 or 15.

Aperture 70 is substantially identical to aperture 71 and is adapted to receive the stem 42 of the cutter block 31. Opposed cutter block shoulders 75 provided adjacent the stem 42 are engaged by margins 76 of the aperture 70 to limit inward movement of the cutter stem 42 and hold the cutter block 31 in position. The stem 42 of the cutter block 31 projects inwardly of the liner 20 and includes abutment faces 77 which are in the same plane as corresponding abutment faces 74 of the spacer block 51 and are also engaged by the ends of associated pipe sections 14 and 15. Both the cutter block 31 and the spacer block 51 are formed from electrically nonconductive material with the result that the pipe sections are completely insulated from each other, it being understood that the liners 20 and 21 insulate the pipe sections from the coupling halves 11 and 12.

The fluid seals 22 which preclude the escape of fluid from the coupling 10 are shown in detail in FIG. 4. The upper and lower seals are substantially identical. Each seal 22 includes a pair of arcuate portions 80 interconnected by longitudinal portions 81. The seals 22 are accommodated within compatible grooves 82 having arcuate and longitudinal portions 83 and 84 respectively and are of such a thickness as to project outwardly from said grooves 82 when installed. Thus, the pipe 13 can, in effect, ride upon said seals 22 as the coupling 10 is rotated. Further, when the coupling 10 is clamped to the pipe sections 14 and 15 following separation of said pipe sections, complete sealing is assured.

It is thought that the structural features and functional advantages of this pipe fitting have become fully apparent from the foregoing description of parts, but for completeness of disclosure, the installation and operation of the fitting will be briefly described.

It will be understood that the liners 20 and 21 are carried by associated coupling halves 11 and 12 and are preferably molded directly to said associated coupling halves.

Before the upper and lower coupling halves 11 and 12 are mounted to the pipe 13, the pipe should be cleaned or otherwise prepared to provide a substantially smooth surface. The faces of the continuous seals 22 should be lightly lubricated. It will be further understood that the arcuate seal portions 80, when placed together, provide a substantially O-ring configuration having an inside diameter substantially equal to the diameter of the pipe 13. When the upper and lower coupling halves 11 and 12 are connected together by means of fasteners 16, said fasteners 16 are tightened sufficiently so that the pipe 13 and coupling 10 are substantially fluid-sealed but the coupling 10 is capable of rotating about the pipe 13 utilizing the O-ring portions of the seals 22 as journal bearings in the first mounted condition.

Advancement of the cutter block 31 by the screws 38 causes cutting pressure to be applied to the cutter wheels 33 and by applying a wrench to the wrench lands provided by the semi-octagonal coupling midportions 24 and 44, the coupling 10 may be rotated about the pipe 13. This rotation orbits the cutter wheels 33 and by applying further pressure to the cutter wheels 33, the pipe 13 may be readily severed and separated into pipe sections 14 and 15. When said pipe sections are drawn apart a distance greater than the width of the liner aperture 71, the spacer block stem 52 is automatically urged into said aperture 71 by the spring 55 until it engages the aperture margin 73. Following this engagement, the cutter block stem 42 may be advanced into its associated liner aperture 70 until it likewise engages the aperture margin 76. The pipe sections 14 and 15 may then be urged together until they contact abutment faces 74 and 77 provided by opposite sides of the spacer block 51 and fasteners 16 may be fully tightened to complete the installation of the pipe fitting. It will be understood that the pipe sections 14 and 15 are completely insulated from the coupling 10 by the liners 20 and 21 and are, in addition, completely insulated from each other by virtue of the separating medium provided by the insulated cutter block 31 and spacer block 51. The pipe sections are thus fully insulated from each other and cathodic protection of either or both of these sections may be carried out independently.

I claim as my invention:

1. A pipe fitting comprising:
   a. a coupling including coupling portions adapted to be disposed in embracing relation about a pipe,
   b. attachment means interconnecting said coupling portions together,
   c. cutter means carried by said coupling and adapted to engage and sever the pipe into sections when the coupling is rotated about the pipe,
   d. means forming a fluid seal around the gap between the pipe sections when said sections are displaced away from one another, and
   e. spacer means carried by said coupling and including a portion independently mounted in movable relation to said cutter means, said spacer means being adapted to be disposed between said pipe sections to separate said pipe sections from electrically conductive contact with each other.

2. A pipe fitting as defined in claim 1, in which:
   f. one of said coupling portions includes a cutter compartment,
   g. the cutter means includes a cutter block movably mounted within said cutter compartment,
   h. the other of said coupling portions includes a spacer compartment, and
   i. the spacer means includes a spacer block, movably mounted within said spacer compartment, and means urging said spacer block between said pipe sections.

3. A pipe fitting as defined in claim 2, in which:
   j. the means urging said spacer block between said pipe sections includes resilient means disposed between said spacer block and said other coupling portion.

4. A pipe fitting as defined in claim 1, in which:
   f. one of said coupling portions includes a cutter compartment,
   g. the cutter means includes a cutter block slidably mounted in said cutter compartment, and means urging said cutter block radially inward,
   h. the other of said coupling portions includes a spacer compartment, and
   i. the spacer means includes a spacer block slidably mounted in said spacer compartment and spring means urging said spacer block radially inward.

5. A pipe fitting as defined in claim 4, in which:
   j. an inner liner of insulating material is carried by each of said coupling portions,
   k. one of said liners includes an aperture communicating between the cutter compartment and the gap between the pipe sections and receiving the cutter block, and l. the other of said liners includes an aperture communicating between the spacer compartment and the gap between the pipe sections and receiving said spacer block.

6. A pipe fitting as defined in claim 5, in which:

m. the cutter block includes a shoulder defining a reduced portion received by the aperture of an associated liner, said aperture providing a margin engageable by said shoulder to limit inward movement of said cutter block, and n. the spacer block includes a shoulder defining a reduced portion received by the aperture of an associated liner, said aperture providing a margin engageable by said shoulder to limit inward movement of said spacer block.

7. A pipe fitting as defined in claim 6, in which:

o. the cutter block is formed from electrically nonconductive material and is substantially T-shaped in configuration including a stem providing the reduced portion and having opposed faces each engageable by the end of an associated pipe section, and p. the spacer block is formed from an electrically nonconductive material and is substantially T-shaped in configuration including a stem providing the reduced portion having opposed faces each engageable by the end of an associated pipe section.

* * * * *